(12) United States Patent
Kavanaugh et al.

(10) Patent No.: US 8,972,556 B2
(45) Date of Patent: Mar. 3, 2015

(54) METHOD AND APPARATUS FOR MANAGEMENT OF NETWORK COMMUNICATIONS

(75) Inventors: Richard Thomas Kavanaugh, Encinitas, CA (US); Gustav Gerald Vos, Surrey (CA); Vasilios V. Daskalopoulos, Edison, NJ (US)

(73) Assignee: Sierra Wireless, Inc., British Columbia (CA)

(*) Notice: Subject to any disclaimer, the term of this patent is extended or adjusted under 35 U.S.C. 154(b) by 161 days.

(21) Appl. No.: 13/465,219

(22) Filed: May 7, 2012

(65) Prior Publication Data

US 2012/0284385 A1 Nov. 8, 2012

Related U.S. Application Data

(60) Provisional application No. 61/483,420, filed on May 6, 2011.

(51) Int. Cl.
| | |
|---|---|
| *G06F 15/173* | (2006.01) |
| *H04L 29/12* | (2006.01) |
| *H04L 29/06* | (2006.01) |
| *H04L 12/26* | (2006.01) |
| *H04W 4/00* | (2009.01) |
| *H04W 76/04* | (2009.01) |

(52) U.S. Cl.
CPC .......... *H04L 61/2553* (2013.01); *H04L 61/256* (2013.01); *H04L 63/029* (2013.01); *H04L 43/10* (2013.01); *H04W 4/001* (2013.01); *H04W 76/045* (2013.01)
USPC ........... 709/223; 709/224; 709/228; 709/206; 370/328; 370/310

(58) Field of Classification Search
CPC ................................ H04L 68/28; H04L 29/02
USPC ........... 709/223–224, 228, 206; 370/328, 310
See application file for complete search history.

(56) References Cited

U.S. PATENT DOCUMENTS

| | | | | |
|---|---|---|---|---|
| 7,280,557 | B1 * | 10/2007 | Biswas et al. | 370/465 |
| 8,326,985 | B2 * | 12/2012 | Luna et al. | 709/224 |
| 2004/0249911 | A1 * | 12/2004 | Alkhatib et al. | 709/223 |
| 2007/0180081 | A1 * | 8/2007 | Okmianski et al. | 709/223 |
| 2007/0248085 | A1 * | 10/2007 | Volpano | 370/389 |
| 2008/0126541 | A1 * | 5/2008 | Rosenberg et al. | 709/225 |
| 2008/0209068 | A1 * | 8/2008 | Herzog et al. | 709/232 |

* cited by examiner

*Primary Examiner* — Wing F Chan
*Assistant Examiner* — Benjamin M Thieu
(74) *Attorney, Agent, or Firm* — Antonelli, Terry, Stout & Kraus, LLP.

(57) ABSTRACT

A method and apparatus for maintaining a communication link through a NAT or other boundary device. Keep-alive messages (keep-alives) are transmitted and received by the boundary device to maintain the link therethrough. Address information of a keep-alive purports that keep-alive has traversed or is to traverse a predetermined portion of the communication link, such as a wireless "over the air" portion. However, the keep-alive is inhibited from traversing the predetermined portion. This may be accomplished by one or more of: spoofing the origin of the keep-alive such that it only appears to have traversed the predetermined portion; and causing the keep-alive to be discarded before traversal of the predetermined portion. Discard may be facilitated by configuration of the TTL field of the keep-alive or by use of a filtering device.

21 Claims, 6 Drawing Sheets

METHOD AND APPARATUS FOR MANAGEMENT OF NETWORK COMMUNICATIONS

CROSS-REFERENCE TO RELATED APPLICATION

This application is a nonprovisional application and claims benefit of the filing date of provisional application No. 61/483,420, filed May 6, 2011, the contents of which are incorporated by reference.

FIELD OF THE TECHNOLOGY

The present technology pertains to the field of network communications and in particular to a method and apparatus for management of network communications.

BACKGROUND

In network communications, a network application (e.g. (Machine to Machine), M2M, cloud-based, etc.) or network server often requires a mechanism to initiate Internet Protocol (IP)-based communications with a device in a mobile or fixed network. However, destination IP address(es) and port(s) for addressing the target device IP are not always available to the entity that wishes to initiate the communication.

This may be due to the fact that a Network Address Translation (NAT), Network Address and Port Translation (NAPT) and/or firewall is maintaining a set of port forwarding rules that prevent inbound-initiated communication addressed to IP address and port combinations, unless a recent outbound communication from the same address and port combination has occurred.

When an outbound IP packet sent by a device traverses a NAT and/or firewall, a "pinhole" port forward rule (binding) is created in the NAT/firewall that allows incoming IP packets over the same address and port combination as the outbound initiating packet. The port forward rule is maintained for a period of time determined by the NAT and/or firewall, but typically not indefinitely. While the port forward rule is maintained, the network application or server can initiate the IP communications with the device over one of the available port forwarding rule address and port combinations.

When a device or network entity does not have prior knowledge of when a network application or server will initiate IP communications, the device or network may be required to maintain the IP connection and pinholes indefinitely (by sending keep-alive inbound and/or outbound IP packets for each address+port combination) to allow for inbound-initiated IP communications. However, this can be an inefficient use of network resources for mobile or fixed networks (e.g. if IPv4 dynamic addresses are limited) as well as for the device (e.g. if the device is battery powered).

For example, a current method for managing communication over a network is described below. A "hole punch msg" is sent from the device through the boundary device in the uplink (UL) direction to create a NAT Port and Address binding which temporarily allows messages in the downlink (DL) direction (addressed to the device) that match the Port and Address binding to traverse the NAT. Periodic keep-alives (KA's) are sent either by the device (UL KA's) or by the server (DL KA's) to prevent the NAT from releasing the Port and Address bindings. However, this method requires significant network and device resources, particularly as NAT's often release bindings every couple of minutes, and KA's typically need to be transmitted before the NAT binding release.

Another method of managing communication over a network is as follows. Once a connection is first established with the device from a server through a NAT/firewall, inbound keep-alive messages are sent at appropriate times by a network entity (e.g. a mediation server), based either on static or predictive application control in the network entity or sent by the network entity indefinitely. This approach may represent a more efficient use of network resources than the approach described above (e.g. Downlink typically has more capacity than uplink, mobile devices use extra power to transmit keep-alive messages but requires no additional power to receive keep-alive messages). However, this approach depends on the device first creating each pinhole before the network entity can then maintain the pinhole with inbound keep-alive messaging. Therefore, this approach is more complex because of the extra steps and coordination between the device and network entity.

Additionally, more complex methods used in SIP communication are defined in "Managing Client-Initiated Connections in the Session Initiation Protocol (SIP)," C. Jennings et al., RFC 5626, Internet Engineering Task Force, October, 2009, where a client-to-server ping is first sent, followed by a server-to-client pong response.

Therefore there is a need for new method and apparatus which overcomes at least one of the problems in the prior art.

This background information is provided to reveal information believed by the applicant to be of possible relevance to the present technology. No admission is necessarily intended, nor should be construed, that any of the preceding information constitutes prior art against the present technology.

SUMMARY

An object of the present technology is to provide a method and apparatus for management of network communications. In accordance with an aspect of the present technology, there is provided a method of maintaining a communication link between a first communication device and a second communication device, the communication link established through a boundary device, the method comprising: maintaining the communication link through the boundary device by transmitting a keep-alive message toward the boundary device, the keep-alive message received by the boundary device and comprising address information indicative that the first communication device is its source or destination, the address information thereby purporting that the keep-alive message has traversed or is to traverse at least a predetermined portion of the communication link coupled to the first communication device and excluding the boundary device; and inhibiting the keep-alive message from traversing the predetermined portion.

In accordance with another aspect of the present technology, there is provided an apparatus for maintaining a communication link between a first communication device and a second communication device, the communication link established through a boundary device, the apparatus comprising one or more computing devices and a network interface module and configured to generate and transmit a keep-alive message toward the boundary device, the keep-alive message comprising address information indicative that the first communication device is its source or destination, the address information thereby purporting that the keep-alive message has traversed or is to traverse at least a predetermined portion of the communication link coupled to the first communication device and excluding the boundary device, the keep-alive message thereby maintaining the communication link through the boundary device upon reception by the boundary device, the keep-alive message further configured and transmitted so as to be inhibited from traversing the predetermined portion.

In accordance with another aspect of the present technology, there is provided a computer program product comprising a memory having computer readable code embodied therein, for execution by a CPU, for performing a method of maintaining a communication link between a first communication device and a second communication device, the communication link established through a boundary device, the method comprising: maintaining the communication link through the boundary device by transmitting a keep-alive message toward the boundary device, the keep-alive message received by the boundary device and comprising address information indicative that the first communication device is its source or destination, the address information thereby purporting that the keep-alive message has traversed or is to traverse at least a predetermined portion of the communication link coupled to the first communication device and excluding the boundary device; and inhibiting the keep-alive message from traversing the predetermined portion.

DETAILED DESCRIPTION OF THE TECHNOLOGY

Definitions

Figure 1:
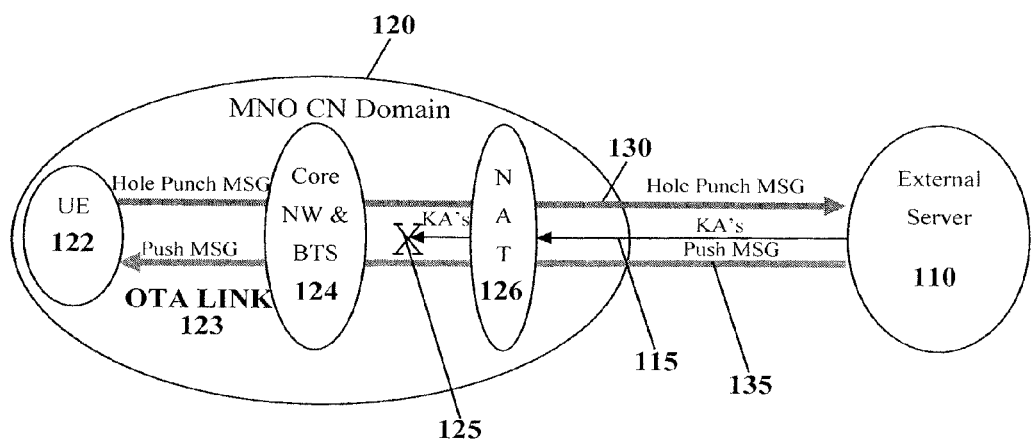
FIG. 1 illustrates a sequence of transmissions configured for the sending of keep-alive messages, in accordance with embodiments of the present technology.

As used herein, the term "about" refers to a +/−10% variation from the nominal value. It is to be understood that such a variation is always included in a given value provided herein, whether or not it is specifically referred to.

As used herein, the term "boundary device" refers to a Network Address Translator (NAT), Network Address and Port Translator (NAPT), a firewall, or the like, or a combination thereof. A boundary device is configured to pass data between networks or sub-networks based on a predetermined set of rules. Such devices are often situated between networks or sub-networks to facilitate network address expansion or customization, security, or the like, or a combination thereof.

Unless defined otherwise, all technical and scientific terms used herein have the same meaning as commonly understood by one of ordinary skill in the art to which this technology belongs.

Embodiments of the present technology provide a general solution on the Internet, an Intranet and/or mobile and fixed networks as a solution for keeping a pinhole (or binding) open in a boundary device such as a NAT, NAPT, or firewall for incoming (terminated/push) communications. The boundary device may be, for example, situated between a core network of a mobile network operator and a broader network, such as the Internet. A pinhole refers to a portion of a two-way communication link passing through the boundary device, which is specific to communication between two predetermined devices. A communication link may correspond to a path through a network or set of networks. For example, incoming packets may be inspected by the boundary device and forwarded through the pinhole only if their address header information (e.g. source address, source port number, destination address and/or destination port number) matches a stored criterion. The two directions of the two-way communication link may be referred to herein as a forward channel and a return channel. The forward channel is typically identified with communication from the UE. Push messages from a server flow then via the return channel.

According to embodiments of the present technology, there is provided a method and apparatus that facilitates, e.g. triggers, the creation, maintenance and termination of the necessary pinholes in the boundary device based on the dynamic need of the network application/server to initiate IP communications.

According to embodiments of the present technology, keep-alive messages ("keep-alives) which are transmitted to the boundary device for the purpose of maintaining a predetermined "pinhole" communication link therein, are handled in such a manner that they traverse less than the whole communication link between their purported source and their purported destination. In particular, the keep-alives may be handled such that their traversal of one or more particular portions of the communication link, such as wireless "over-the-air" portions, or band-limited or tolled portions, is inhibited.

The above-identified purported source and destination may correspond, for example, to packet header information such as source address and optionally source port number, and destination address and optionally destination port number. In the case of a NAT or NAPT, at least some of this packet header information may be indirectly specified. For example, as per the fundamental operation of a NAT or NAPT, the source address, source port number, destination address and/or destination port number specified by a packet, as it is received by the NAT or NAPT may be translated by the NAT or NAPT to a new the source address, source port number, destination address and/or destination port number. The purported destination of the packet thus corresponds to the new destination address and/or new destination port number after translation. However, the purported destination is also present, in the packet as received by the NAT or NAPT, in an alias form, which is readily identifiable and translatable by the NAT or NAPT. Similarly, the purported source of the packet may be plainly present in the packet as it is received by the NAT or NAPT and present in alias form in the packet after translation.

In accordance with an aspect of the present technology, there is provided a method for maintaining a communication link between a first communication device and a second communication device. The communication link is established through a boundary device, such as a NAT. The method comprises maintaining the communication link through the boundary device by transmitting one or more keep-alive messages toward the boundary device. Keep-alive messages may be transmitted periodically to inhibit expiry of a boundary device pinhole which forms part of the communication link.

Keep-alive messages are subsequently received by the boundary device and comprise address information indicative that the first communication device is its source or destination. The address information thereby purports that the keep-alive message has traversed or is to traverse at least a predetermined portion of the communication link coupled to the first communication device and excluding the boundary device. The predetermined portion may be a wireless link, for example. The method further comprises inhibiting the keep-alive message from traversing the predetermined portion.

In accordance with another aspect of the present technology, there is provided an apparatus for maintaining a communication link between a first communication device and a second communication device. The communication link is established through a boundary device. The apparatus comprises one or more computing devices and a network interface module. The apparatus may be a server, proxy server, computer capable of network communication, or a functional aspect of an existing server, proxy server, computer, or network device, such as a NAT or infrastructure device within an MNO CN. The apparatus is configured to generate and transmit a keep-alive message toward the boundary device. The keep-alive message comprises address information indicative that the first communication device is the source or destination of the keep-alive message. The address information thereby purports that the keep-alive message has traversed or is to traverse at least a predetermined portion of the communication link, such as an OTA portion, coupled to the first communication device and excluding the boundary device. The keep-alive message thereby maintains the communication link through the boundary device upon reception by the boundary device. The keep-alive message is further configured and transmitted so as to be inhibited from traversing the predetermined portion.

One or more mechanisms may be employed to facilitate the above-identified handling of the keep-alives. In some embodiments a combination of such mechanisms may be employed. Some of these mechanisms comprise: generating the keep-alive message at a keep-alive server operatively coupled to the boundary device via an auxiliary communication link that excludes the predetermined portion. Some of these mechanisms comprise: spoofing the keep-alive messages as originating from the first communication device or the second communication device. Some of these mechanisms comprise: causing the keep-alive messages to be discarded before traversal of the predetermined portion, for example by appropriate configuration of the Time To Live (TTL) associated with the keep-alive message or by use of a filtering device. Some of these mechanisms comprise: transmitting keep-alives from a keep-alive proxy server operatively coupled to the boundary device via an auxiliary communication link, the keep-alive proxy server configured as a proxy server for communication with the second communication device.

According to some embodiments, the method and apparatus are configured to drop keep-alives before being transmitted over some predetermined portion of the network, for example before going "over the air," that is, before the messages are transmitted over the wireless portion of a local network. Additionally or alternatively, the method and apparatus may be configured to apply a keep-alive lease time, such that a device such as a wireless terminal or other device behind a boundary device is configured to transmit keep-alive messages until expiry of the lease time, which may be specified by a server, wherein it is desired to be able to reach the device from outside of the boundary device until expiry of the lease time.

In some embodiments, as an operating exception case, the first communication device (for example a UE) and the second communication device (for example a server) may agree to conditions when the first communication device would ignore a KA received thereby.

Discard Keep-Alives Before Traversing Link Portion

According to some embodiments, the present technology provides a means to use keep-alives (KAs) to maintain the boundary device binding but to also cause the keep-alives to be discarded before traversing a predetermined portion of the communication link. The keep-alives may thus be discarded at a predetermined point along the communication link, after traversing the boundary device but before reaching the nominal addressee. A keep-alive generally refers to a message (such as a packet) which is transmitted for the purpose of maintaining the boundary device pinhole, for example by maintaining a NAT binding. As would be readily understood by a worker skilled in the art, the boundary device inspects the source address, source port number, destination address, destination port number, or combination thereof, of the keep-alive, and establishes, maintains or renews the appropriate bindings based on said inspection. However, it is recognized by the applicant that, after the boundary device has inspected the keep-alive, the keep-alive may have fulfilled its purpose, and hence the network may be run more efficiently if the keep-alive is discarded after inspection. Furthermore, it is recognized that it may be advantageous to discard keep-alives before they enter or traverse a part of the network which is bandwidth-constrained, which incurs a monetary charge for forwarding the keep-alive, or the like. If the nominal addressee (such as a wireless terminal) of the keep-alive is also limited in resources such as battery life, processing power, or communication bandwidth, it may also be advantageous to discard keep-alives before they reach the addressee.

In some embodiments, the predetermined portion of the communication link is an over-the-air link of a wireless network operated by a mobile network operator (MNO). The keep-alives may thus be discarded before being transmitted over the air (OTA) so that the expensive and resource limited OTA link is not used. Preferably, the keep-alives are discarded before the MNO billing system accounts for them (e.g. before the keep-alive messages are received by the SGSN/SGW) so the owner of a wireless terminal to which the keep-alives are addressed does not get charged for same, and thus no changes to the MNO's billing system are needed. An advantage of this solution is that substantially no changes are required to the operation of the boundary device. Another potential advantage, in some embodiments, is that substantially no changes are required in the MNO core network (CN).

As described below and herein, embodiments of the present technology specify one or both of: the originator of the keep-alive messages; and the mechanism by which the keep-alives are discarded at an appropriate location within the network.

External Server Transmission of Keep-Alives

In some embodiments, the keep-alives are transmitted by an entity, such as a physical server, virtual server, or other network device function, which is external to the local network in which the nominal addressee of the keep-alives resides, and are dropped after traversing the boundary device. The server may be external to a Mobile Network Operator (MNO) core network (CN), for example. The boundary device is thus interposed between the server and addressee along the communication link therebetween. The server may be an application server, for example coupled to the Internet.

The server may be a computer server or virtual server on which a predetermined application is running, or the like.

In some embodiments, another device external to the addressee's local network may function as the server. The other device may be configured via software to operate analogously to the server. The other device may be an existing device of a network infrastructure. The other device may be a personal computer or mobile device operatively coupled to the Internet. The present technology may thereby be applied in a peer-to-peer setting, for example.

In some embodiments, an advantage of transmitting keep-alives from an external server is that network resources may be less constrained on the external server's side of the boundary device than on the target device's side. Thus, more benefit may be gained by discarding keep-alives on the target device's (UE) side than would have been gained by discarding the keep-alives on the server's side.

In some embodiments, another advantage of transmitting keep-alives from an external source is that the local network, for example the MNO CN, does not need to be adjusted to include and/or accommodate sources of keep-alive messages, to adjust operating protocols, or the like.

In some embodiments, additional mechanisms may be provided to cause the keep-alives to be discarded upon or after traversing the boundary device, for example as soon as is practicable after the traversal, and preferably before the keep-alives traverse the predetermined portion of the communication link.

In some embodiments, additional mechanisms may be provided to mitigate the potential for the keep-alives to create billable traffic along its path, for example traffic billable to the MNO or External Server service provider due to the keep-alives crossing ISP boundaries or generating other billing triggers. For example, the server may be selected so as to be relatively close to the boundary device in a network sense.

FIG. 1 illustrates transmission of Keep-Alives (KA's) 115 by an external server 110, in accordance with embodiments of the present technology. An MNO CN domain 120 comprises a mobile user equipment (UE) 122, a core network and base transceiver station (BTS) 124, and a boundary device (illustrated as a NAT) 126. The user equipment 122 is communicatively coupled to the core network and BTS 124 via a wireless, over-the-air (OTA) link 123.

The boundary device is first configured to allow the passage of messages from the server 110 to the UE 122. For example, as illustrated, the UE 122 transmits a "hole punch" message 130 over the OTA link 123, through the boundary device 126 and to the server 110. Passage through the boundary device in this direction is considered herein to correspond with passage through a forward channel of the boundary device. In response to the hole punch message, a return channel is established through the boundary device, wherein the boundary device is configured to forward appropriately addressed messages from the server 110 to the UE 122, as would be readily understood by a worker skilled in the art. Various other means may be used to establish the return channel. As long as the return channel is operational, messages, such as push messages 135 from the server 110 can be forwarded by the boundary device 126 to the UE 122, as would also be readily understood by a worker skilled in the art.

A boundary device is typically configured to close the return channel after a predetermined amount of time in which there is no activity on the return channel and/or on an associated forward channel. Transmitting Keep-Alive messages (KA's) over the return channel are a generally accepted means of keeping the boundary device from closing the return channel, by causing traffic on the return channel for the purpose of keeping the return channel open. In the present embodiment, the server 110 transmits KA's 115 to the boundary device, appropriately configured (e.g. via source address, source port, destination address, destination port, or a combination thereof), so that the return channel is maintained open. For example, each KA may be received by the boundary device before a timer related to the return channel times out (wherein timer timeout would cause closure of the return channel, and reception of the KA causes the timer to reset).

In accordance with the present embodiment, the KA's 115 are discarded after they have been used at the boundary device to maintain the return channel. For example, the KA's 115 may be discarded at a point 125 between the boundary device 126 and the core network and BTS 124, or within the boundary device 126 or within the core network or BTS, but preferably before reaching the OTA link 123. The point 125 is generally coincident with a network device. As described elsewhere herein, the TTL header or a filter placed within the network may be used to facilitate the discard.

The mechanism illustrated in FIG. 1 may be configured to avoid transmission of KA's over the OTA link, essentially by causing the KA's to be discarded before reaching the OTA link.

Internal Server for Transmission of Keep-Alives

Figure 2:
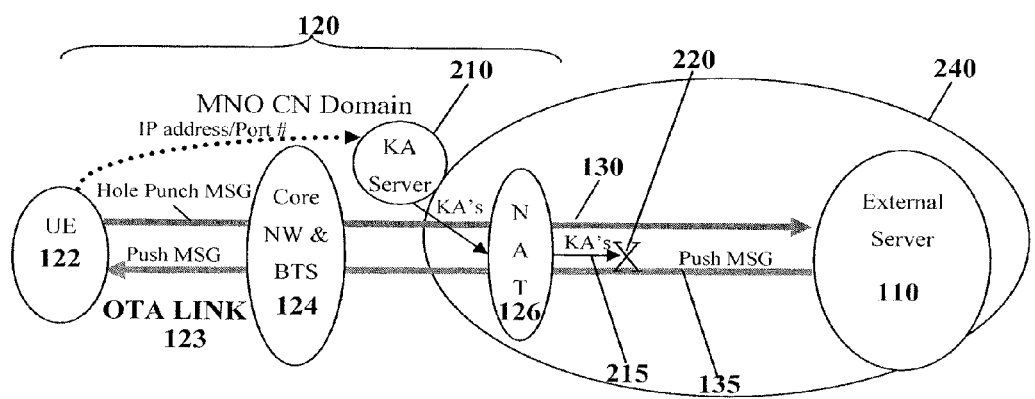
FIG. 2 illustrates a sequence of transmissions configured for the sending of keep-alive messages, in accordance with embodiments of the present technology.
Figure 3:
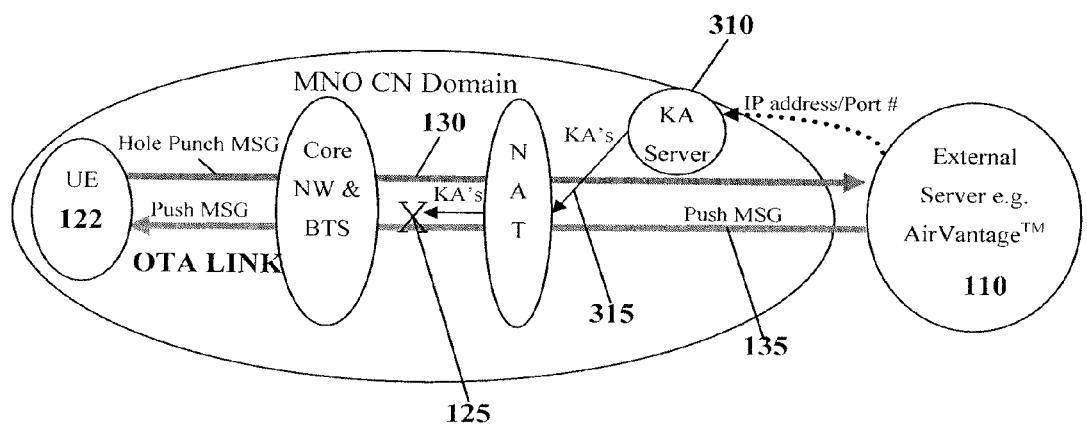
FIG. 3 illustrates a sequence of transmissions configured for the sending of keep-alive messages, in accordance with embodiments of the present technology.

In some embodiments, as illustrated in FIGS. 2 and 3, a new entity (i.e. the Keep-Alive Server or KA server) within the MNO CN domain sends the keep-alives. The Keep-Alive Server may be a separate device within the MNO CN domain, or it may be part of another device. For example, in some embodiments, the Keep-Alive Server is part of the boundary device. The Keep-Alive Server may be provided through a software function of a NAT, for example. Similarly, a Keep-Alive Server located externally to the MNO CN, or a Keep-alive Proxy Server, or the like, may be provided as a separate network device within the appropriate part of the network, or it may be provided as part of another device, for example through a software function.

In some embodiments, if the KA Server is on the same side of boundary device as the first communication device, e.g. the UE, the KA Server sends UL KA's (that is, KA's in the uplink direction toward the second communication device) and spoofs the IP address/port binding sent in the "Hole Punch" message to keep boundary device binding open for push data from the External Server. That is, the KA's are configured to appear as if they originated from the source specified in the hole punch message. The KA Server can obtain the IP address for spoofing from the Authentication, Authorization and Accounting (AAA) server and the port number can be predetermined (e.g. fixed). Alternately, the first communication device can send this information directly to the KA Server. Alternately, if the External Server has a signalling interface into the MNO CN Domain, this interface can be used for the External Server to provide this information to the KA Server (not illustrated).

In some embodiments, discarding the KA's is performed by a filtering network device rather than by configuring the TTL header of the KA's. A reason for this is that expiry of the TTL header typically generates an Internet Control Message Protocol (ICMP) message, or the like, addressed to the first network device. The ICMP message indicates that the TTL has expired. Therefore, even though the KA itself is inhibited from traversing the predetermined portion of the communication link, the ICMP message could traverse the predetermined portion, which may also be undesirable. Therefore it may be preferable to discard KA's using a filter. However, it is noted that, if the uplink from the first network device is more restrictive than the downlink, traffic over the predetermined portion in the uplink direction may be more undesirable than traffic over the predetermined portion in the downlink direction. Therefore, in some instances, some benefits may still be derived from the present technology even if the ICMP messages or other responses triggered by the KA message are not inhibited from traversing the predetermined portion.

In some such embodiments, such undesirable system messages, such as an ICMP message indicative that the TTL has expired, may be filtered at a filtering network device before traversing the predetermined portion of the communication link. Filtering may be performed at least in part by message type (e.g. ICMP TTL expiry message).

Similarly, if the KA is not discarded, the second network device may automatically transmit an acknowledgement of the KA to the first network device. This acknowledgement may undesirably traverse the predetermined portion of the communication link. To avoid this, in some embodiments, the second network device may be specifically configured not to acknowledge the KA. In other embodiments, the acknowledgement may be filtered at a filtering network device, similarly to how KA's are filtered.

In some embodiments, if the KA Server is on the opposite side of the boundary device as the first communication device, e.g. the UE, the KA Server will send DL KA's (that is, KA's in the downlink direction toward the first communication device) and spoofs the IP address/Port numbers of the External Server to keep boundary device binding open for push data from the External Server. The KA's may thus be configured to appear as if they originated from the destination specified in the hole punch message. The KA Server can obtain the IP address/Port numbers directly from the External Server. Alternately, if the UE has a signalling interface to the KA Server, this interface can be used by the UE to provide this information to the KA Server (not illustrated).

In some embodiments, an advantage associated with using an internal or external KA server for transmission of KA's is that the KA's do not have to traverse as far as they would if transmitted from the second communication device (external server). In addition to using fewer network resources due to a shorter network path, fewer opportunities for variability exist along that shorter path. This may improve reliability of packet discard at a desired location using the TTL approach described herein, since the TTL will be treated in a more predictable manner.

In some embodiments, an advantage associated with using an internal KA server for transmission of KA's is that internal KA servers may have internal knowledge of the MNO CN topology. This may facilitate discarding of KA's for example since network path lengths, and the associated TTL behaviour of KA's may be more readily known. Thus, reliability of packet discard may again be improved.

In some embodiments, it may be required to adjust the MNO CN to accommodate the additional KA server or servers. In addition, changes to the operating protocols associated with the MNO CN may be required.

The KA server is generally configured so as to be capable of spoofing the UE or server, depending on whether the KA's are to be sent in the uplink (forward path from UE to server) or downlink (return path from server to UE) direction. For example, in the case of IP packets, the KA server may be configured to specify, as the source address of outgoing KA's, the IP address of the UE or server. In the case of TCP or UDP packets, or the like, the KA server may further be configured to specify, as the source port number of outgoing KA's, the port number of the UE or server. As the destination address and/or port number of the KA messages, the KA server may be configured to specify the IP address and/or port number of the entity (UE or server) not being spoofed. Alternatively, where applicable, the KA server may be configured to specify an IP address and/or port number which, when operated upon by the boundary device, is translated into the IP address and/or port number of said entity not being spoofed. Note that addresses and port numbers, spoofed or otherwise, may be changed by the boundary device (e.g. in the case of a NAT or NAPT), however this is in keeping with the intended operation of the boundary device and the system as a whole.

FIG. 2 illustrates a network, hole punch message 130, and push message 135 similar to that of FIG. 1, with the difference that the Keep-Alives (KA's) are transmitted from within the MNO CN Domain 120 by a KA Server 210. The KA's are addressed toward the external server 110, and may be forwarded toward the external server 110 upon receipt by the boundary device 126.

As mentioned above with respect to FIG. 1, a boundary device is typically configured to close the return channel after a predetermined amount of time in which there is no activity on the return channel and/or on an associated forward channel. The forward channel, for example, is the means whereby the boundary device accepts a message from within the MNO CN domain, the message intended for the external server, adjusts the message (for example by modifying the source address and source port number), and transmits it to the external server. Transmitting Keep-Alive messages (KA's) over the forward channel is a generally accepted means of keeping the boundary device from closing the return channel, by causing traffic on the forward channel for the purpose of keeping the associated return channel open. In the present embodiment, the KA server 210 transmits KA's 215 to the boundary device, appropriately configured (e.g. via source address, source port, destination address, destination port, or a combination thereof), so that the return channel is maintained open. For example, each KA may be received by the boundary device before a timer related to the return channel times out (wherein timer timeout would cause closure of the return channel, and reception of the KA causes the timer to reset).

The KA Server 210 is provided with information allowing it to spoof the UE 122, insofar as the KA's 215 transmitted thereby are interpreted by the boundary device as originating from the UE. For example, the KA server may configure the KA's to have the source address and source port number of the UE. This information may be obtained from the UE 122, from the external server 110, or from another server such as an AAA server. The KA server 210 may be configured to begin transmitting KA's upon receipt of a message prompting it to do so. Alternatively, the KA server may be configured to monitor network conditions and automatically begin transmitting KA's upon determining that they are necessary, for example upon discovery of a forward and/or return channel being established through the boundary device between a qualifying UE and a qualifying external server.

In accordance with the present embodiment, the KA's 215 are discarded after they have been used at the boundary device to maintain the return channel. For example, the KA's 215 may be discarded at a point 220 between the boundary device 126 and the external server 110, or within the boundary device 126. The point 220 is generally coincident with a network device, and is preferably as close to the boundary device as is practicable. As described elsewhere herein, the TTL header may be used to facilitate the discard. A filter within the external network 240 between the boundary device 126 and the external server 110 may conceivably be used to facilitate the discard. However, if the external network 240 displays a variety of possible paths and/or a variety of ownership of network elements (for example as in the case of the Internet), this method may not be suitable.

FIG. 3 illustrates a network, hole punch message 130, and push message 135 similar to that of FIG. 2, with the difference that the KA server 210 is replaced with a KA server 310, within the MNO CN domain, which transmits KA's 315 to the boundary device for traversal through the return channel. Rather than spoofing the UE 122, the KA server 310 spoofs the external server 110. Spoofing of the external server may comprise the KA server 310 configuring the KA's 315 transmitted thereby to have the source address and source port number of the external server 110. That is, for example, the KA's may have as their source address and source port number the destination address and destination port number of the hole punch message 130.

The KA Server 310 is provided with information allowing it to spoof the external server 110, insofar as the KA's 315 transmitted thereby are interpreted by the boundary device as originating from the external server. For example, the KA server may configure the KA's to have the source address and source port number of the external server. This information may be obtained from the external server 110, from the UE 122, or from another server such as an AAA server. The KA server 310 may be configured to begin transmitting KA's upon receipt of a message prompting it to do so. Alternatively, the KA server may be configured to monitor network conditions and automatically begin transmitting KA's upon determining that they are necessary, for example upon discovery of a forward and/or return channel being established through the boundary device between a qualifying UE and a qualifying external server.

The KA's 315 are, except for their origin and possibly their path to the boundary device, similar to the KA's 115 as illustrated in FIG. 1. Similarly to FIG. 1, the KA's may be discarded at the point 125 or at the boundary device 126 or within the core network and BTS 124. A filter may be placed within the MNO CN Domain for the purpose of discarding the KA's 315, or the TTL header may be used to facilitate the discard. The more static the connection between the KA server 310 and the boundary device 126 in terms of number of hops, the more reliable the TTL header method may be. Thus, in some embodiments, it is preferable to have the KA server be located, in network terms, relatively close to the boundary device.

In some embodiments, the KA server 210 and the KA server 310 may be different aspects of a single general KA server. The general KA server may then operate in the manner of either KA server 210 or 310 as may fit the circumstances.

The mechanism illustrated in FIG. 2 may be configured to avoid transmission of KA's over the OTA link, essentially by causing the KA's to originate on the other side of the OTA link from the UE and travel away from the OTA link, while still appearing to have originated from the UE. Full traversal of the external network to the external server may also be avoided by causing the KA's to be discarded at an intermediate point in the external network.

The mechanism illustrated in FIG. 3 may be configured to avoid transmission of KA's over the OTA link, essentially by causing the KA's to be discarded before reaching the OTA link. Use of a KA server may facilitate more reliable discard of the KA's, since the link from the KA server to the boundary device and beyond may be made to be more stable and predictable, while still appearing to have originated from the external server. Full traversal of the external network from the external server may also be avoided by causing the KA's to originate at the KA Server.

Keep-Alive Proxy Server

Figure 4:
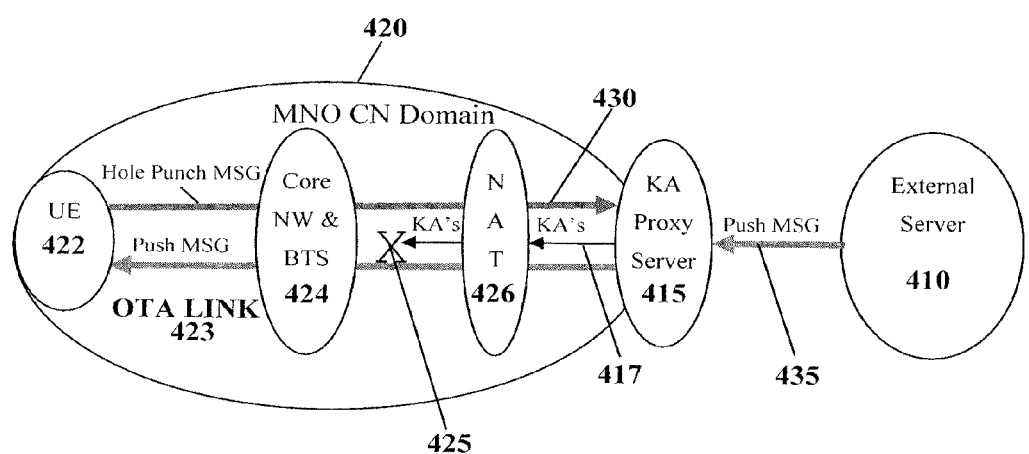
FIG. 4 illustrates a sequence of transmissions configured for the sending of keep-alive messages, in accordance with embodiments of the present technology.

In some embodiments as illustrated in FIG. 4, a Keep-alive (KA) Proxy Server is used as a proxy for downlink push data from the external server. The KA Proxy Server may reside in or external to the MNO CN domain and is communicatively coupled between the boundary device and the external server.

The KA Proxy Server is configured to send DL KA's (i.e. along the boundary device return path). The KA Proxy Server may be further configured to provide a user plane interface for the External Server. The External Server may send push traffic to the KA Proxy Server, for forwarding to the UE. The KA Proxy Server may thus be regarded as providing an on-path solution. As such, the KA Proxy Sever does not have to spoof the IP address and/or port of the External Server when transmitting KA's. Rather, the UE addresses its "hole punch" message to the KA Proxy Server instead of the External Server, and the KA Proxy Server operates as the intermediary for forwarding push messages from the External Server to the UE through the boundary device.

In some embodiments, an advantage of using a KA proxy server, as with the KA server, is that the KA's do not have to traverse the entire path from the external server to the boundary device. If the KA Proxy server is located closer to the boundary device than the external server, network resources may thus be conserved and network path variability may be reduced.

In some embodiments, operation of the KA proxy server may be configured based on knowledge of the MNO CN topology. In some embodiments, MNO CN topology information may be forwarded from the MNO to the KA proxy server. This may simplify dropping of KA's, for example since the TTL field of a KA can be configured based on explicitly provided knowledge of network topology, rather than based on knowledge derived through trial and error. For example, based at least in part on the MNO CN topology information, the KA proxy server may determine that it is 3 hops from the boundary device and that transmission of the KA by more than 6 hops would likely result in an undesirable OTA transmission. As such, the KA proxy server may configure the TTL field of each KA to be at least 3 but no greater than 6, thereby causing the KA to be received by the boundary device but not transmitted OTA.

Embodiments of the present technology provide a means by which UE's are provided, as required, with the IP address of an appropriate KA Proxy Server to which to address the initial "Hole Punch" message. For example, when a UE is instructed to generate a hole punch message, for example via an out-of-band communication such as an SMS, it may be provided with the address of a KA proxy server and instructed to address the "hole punch" message to same. The KA proxy server may be selected on the basis of geographic location, available capacity, network traffic, and the like.

Embodiments of the present technology provide a means by which the External Server (second communication device) is provided with the address of an appropriate KA Proxy Server to send push messages to, rather than to the (external) address of the UE or boundary device. For example, the External Server may be provided with the KA Proxy Server's address at substantially the same time that the UE is provided with its instructions to generate the "hole punch" message, and from the same source. This address may be provided along with instructions to transmit push messages to the KA Proxy Server's address when it is desired to contact the identified UE. As another example, the KA Proxy Server may, upon receipt of each "hole punch" message, generate and transmit a message to an External Server, the message identifying the UE and instructing the External Server to transmit push messages to the KA Proxy Server's address when it is desired to contact the identified UE. The particular External Server to be messaged may be predetermined or designated in the body of the "hole punch" message, for example.

FIG. 4 illustrates transmission of Keep-Alives (KA's) 417 by a KA proxy server 415, in accordance with embodiments of the present technology. An MNO CN domain 420 comprises a mobile user equipment (UE) 422, a core network and base transceiver station (BTS) 424, and a boundary device 426. The user equipment 422 is communicatively coupled to the core network and BTS 424 via a wireless, over-the-air (OTA) link 423.

The boundary device is first configured to allow the passage of messages from the server 410 to the UE 422. For example, as illustrated, the UE 422 transmits a "hole punch" message 430 over the OTA link 423, through a forward channel of the boundary device 426 and to the proxy server 415. Optionally the hole punch message may then be forwarded to the server 410, although this may be unnecessary for operation. In response to the hole punch message, the boundary device establishes a return channel therethrough. The boundary device is thereafter configured to forward appropriately addressed messages from the KA proxy server 415 to the UE 422. Messages from the KA proxy server 415 may be messages originating from the server 410 and forwarded by the KA proxy server 415. Various other means may be used to establish the return channel. As long as the return channel is operational, messages, such as push messages 435 originating from the server 410 can be forwarded by the boundary device 426 to the UE 422, as would also be readily understood by a worker skilled in the art.

In the present embodiment, the proxy server 415 transmits KA's 417 to the boundary device, appropriately configured (e.g. via source address, source port, destination address, destination port, or a combination thereof), so that the return channel is maintained open. For example, each KA may be received by the boundary device before a timer related to the return channel times out (wherein timer timeout would cause closure of the return channel, and reception of the KA causes the timer to reset).

In accordance with the present embodiment, the KA's 417 are discarded after they have been used at the boundary device to maintain the return channel. For example, the KA's 417 may be discarded at a point 425 between the boundary device 426 and the core network and BTS 424, or within the boundary device 426 or within the core network or BTS, but preferably before reaching the OTA link 423. The point 425 is generally coincident with a network device. As described elsewhere herein, the TTL header or a filter placed within the network may be used to facilitate the discard. The KA proxy server 415 may be configured to set the TTL header appropriately.

The mechanism illustrated in FIG. 4 may be configured to avoid transmission of KA's over the OTA link, essentially by causing the KA's to be discarded before reaching the OTA link. Use of a KA Proxy Server may facilitate more reliable discard of the KA's, since the link from the KA server to the boundary device and beyond may be made to be more stable and predictable. The KA's need not be altered to make them appear to have originated from the external server. Full traversal of the external network from the external server may also be avoided by causing the KA's to originate at the KA Proxy Server.

Keep-Alive Discard Using TTL Field in IP Header

In embodiments of the present technology, causing the keep alive message to be discarded before it traverses the predetermined portion of the communication link comprises configuring a time to live of the keep alive message, such that the time to live expires after the keep alive message traverses the boundary device and before the keep alive message traverses the predetermined portion. The appropriate range of time to live values which accomplish this may be known a priori or may be discovered and optionally monitored.

The TTL field is set by the sender of the datagram, and reduced by every host on the route to its destination. In practice, the TTL field is reduced by one on every hop. To reflect this practice, the field is renamed hop limit in IPv6. The term "TTL" is intended herein to include the IPv6 "hop limit," along with other related mechanisms, associated with other present or future protocols, which function in substantially the same manner. The term "TTL field" may thus more generally refer to a field within a message (e.g. a packet) which may be operated on when the message is forwarded and is used to control the number of times the message is forwarded. Alternatively, the TTL field may be configured to limit the actual time a message is "alive" for, limiting the distance the message may travel, limiting the number of predetermined boundaries the message may cross, or the like. Limiting a message's life in terms of actual time, rather than number of hops, was specified for example for IPv4. In the case of current IP protocols, if the TTL field reaches zero before the datagram arrives at its destination, then the datagram is discarded and an ICMP error datagram (11—Time Exceeded) is sent back to the sender.

According to embodiments of the present technology, using a priori knowledge (usually if KA server is internal to MNO CN) or using network topology discovery mechanisms (e.g. trace routes) the KA sender determines the IP address of the boundary device server. In many cases, for example in the case of a NAT, the IP address of the boundary device is the same public IP address that the boundary device assigned to the UE's binding so this given to the KA sender in the "hole punch" message. The KA sender then sets the TTL field in the IP header of the keep-alive message such that the message gets dropped as soon as is practicable after the boundary device. The KA sender, that is the originator of the KA messages, may be the second communication device, a KA server, a KA proxy server, or the like, depending on the particular implementation.

If the communication link is variable, for example in that it comprises a variable network path and number of hops, the appropriate range of time to live values may also vary. In this case, embodiments of the present technology may be configured to track the appropriate range of time to live values. To facilitate reliable operation in the face of communication link variability, the TTL field setting may be set higher than the minimum within the appropriate range, but still lower than the maximum within the appropriate range, in order that the message is more likely to reach the boundary device.

In embodiments, error handling can be performed as follows: If the DL KA is received by the UE then the KA sender should be informed that the TTL is too long. The KA sender can also use the ICMP error packets as an indicator if the TTL is too short or too long. If the SRC IP address returned in the ICMP packet changes, this means that route (i.e. number of hops) the KA has taken has changed. In response, the KA sender may be configured to initiate re-discovery of the route (e.g. by using traceroute or similar network discovery means) to see how many hops this new IP address is from the boundary device and possibly re-adjust the TTL setting of the KA messages. If the route changes suddenly before the new route can be discovered the boundary device binding may be lost. The KA sender may discover this when it uses a higher than required TTL and no ICMP error is returned (because the boundary device dropped the message). In this case, the KA sender would have to use an alternate method (e.g. SMS, CBC msg.) to inform the UE that the bind was lost and it needs to resend the "hole punch" message.

In some embodiments, a fraction of the KA's may be purposefully configured to reach the UE. Such KA's may be transmitted periodically, for example. This may be done for example by increasing the TTL of selected KA's. Alternatively, if filtering is used to discard KA's, this may be done by configuring selected KA's such that they do not have characteristics which would cause the filter to discard them. For example, a selected marker within the KA payload may be removed or altered. Allowing some KA's to reach the UE may be done to ensure that the UE is still present and/or connected to a service provided by the server. Alternatively, a standard (non KA) message may be transmitted periodically to the UE.

If the keep-alives are sent in the UL direction, similar error handling concepts can be used as in the DL direction using ICMP error message and indication from the server.

In some embodiments, using the TTL field for KA message discard is advantageous in that changes or reconfiguration of network devices, for example devices of the MNO CN, and protocol changes, may not be required.

In some cases, discovery of the appropriate range of TTL values and boundary device IP address may be difficult. For example, to hide NW topology for security reasons, some nodes may not return an ICMP error datagram. In such cases, special methods, explicit queries and/or network administrator intervention may be required to obtain the necessary information.

Keep-Alive Discard Using Filtering/Deep Packet Inspection (DPI)

According to some embodiments, the discarding of KA's may be performed using a filtering and/or deep packet inspection network device placed within the network along the communication link. The filtering network device is located and configured to identify and discard KA's prior to their traversal of the predetermined portion of the communication link.

Most MNO's have the ability to filter and then drop certain messages. For example, a Public Data Network Gateway (PGW) or a Gateway GPRS Support Node (GGSN) may confer this ability. In some embodiments, for KA's transmitted in the downlink direction, a filter in the PGW or GGSN may be set up to drop all DL KA's. In some embodiments, for KA's transmitted in the UL direction, a filter in an Application Layer Gateway (ALG), located on the opposite side of the boundary device as the first communication device (e.g. opposite side from the UE), and near the boundary of the MNO domain, can be configured to drop all UL KA's. The KA's may be configured having identifiable characteristics such as Port number, protocol, and user plane signature. The filtering network devices are then configured to identify these characteristics and discard messages having same.

In some embodiments, when a filtering device discards a KA, it may record and/or report the discard event. Discard events, for example including time and KA message header information, may be recorded in local memory, available for later query by other devices. Discard events may be reported individually or in aggregate to a designated other device, for example the second network device (server) or an administrative device within the MNO CN.

In some cases, the filtering method may provide a reliable means of discarding KA messages at appropriate locations, such as the PGW, GGSN and/or AGW. Protocol changes are not necessarily required as the filtering network device may operate substantially independently and interoperate with existing protocols.

Consideration, setup, support and maintenance of the filtering network devices may be performed by the MNO. Information regarding how to configure KA messages so that they are filtered may be provided to the entities sending the KA's, so that the KA's may be appropriately configured. In some embodiments, care may be required to avoid erroneously dropping non-KA messages if they happen to match the filtering parameters. A strong set of parameters may be employed to minimize the possibility of such erroneous message dropping.

Pinhole Timeout Discovery

As described herein, the pinhole communication link through a boundary device such as a NAT is typically configured to terminate after a predetermined period of inactivity. Thus, the keep-alive messages are transmitted to inhibit this termination. To be effective for extended periods, plural KA's should be transmitted, with the time between KA transmissions being shorter than the pinhole timeout value as set by the boundary device. To be efficient, the time between KA transmissions should be relatively close to the pinhole timeout value, so that unnecessary KA's are not transmitted. Thus, it is desirable to discover the pinhole timeout value implemented by the boundary device.

In some embodiments, the pinhole timeout value may be provided by a network administrator and programmed into the device transmitting KA's. In some embodiments, the device transmitting KA's may receive a message from the boundary device (for example in response to a query) which indicates the pinhole timeout value.

In some embodiments, for example when the pinhole timeout value is not explicitly accessible, the device transmitting KA's may be configured to discover it using the following method. Initially, KA's may be transmitted at a high frequency, such that the time between KA transmissions is expected, with a high level of confidence, to be shorter than the pinhole timeout value. The time between KA transmissions may then be gradually increased until a pinhole timeout event is encountered. The pinhole timeout event may be detected, for example, by receipt of an error message from the boundary device, indicating that the pinhole is no longer open, or by lack of receipt of an acknowledgement of the KA message from a device beyond the boundary device. Once the pinhole timeout event is encountered, the pinhole timeout value is approximately known and may be recorded. Re-establishment of the pinhole is then performed, for example by transmitting an out-of-band (e.g. SMS) message to the UE to initiate a new "hole punch" message. Use of this method may require an awareness of other events that may reset the pinhole timeout timer during discovery.

Keep-Alive Lease Time

In some embodiments, transmission of keep-alive messages, for example by a keep-alive server, keep-alive proxy server, or other device within a network, may be regulated by a keep-alive lease, such that keep-alive messages are transmitted periodically until expiry of the keep-alive lease.

According to some embodiments, the present technology leverages and extends an off-path (out-of-band) interface used for triggering a device to establish an IP connection that can be reachable by a network app/server. Aspects of this are described in U.S. patent application Ser. No. 13/368,914 entitled "Method and System for Forwarding Data Between Network Devices."

The Device Trigger Gateway (DT-GW) of a network provides a reference point (MTCsp) terminating in the Home Public Land Mobile Network (PLMN) of a device that can be used by Machine-Type Communications (MTC) Servers to send a trigger indication to trigger the device to establish a Packet Data Protocol (PDP) context/Public Data Network (PDN) connection that is reachable by the MTC Server or a network-based application for IP communications. Once the PDP context/PDN connection is established the device may send outbound IP messages to the MTC Server and/or network application to create any necessary pinholes in boundary device/firewalls that exist between the device and server to help the MTC Server/app determine the destination IP address(es) and port(s) that can be used for inbound IP messaging.

Figure 5:
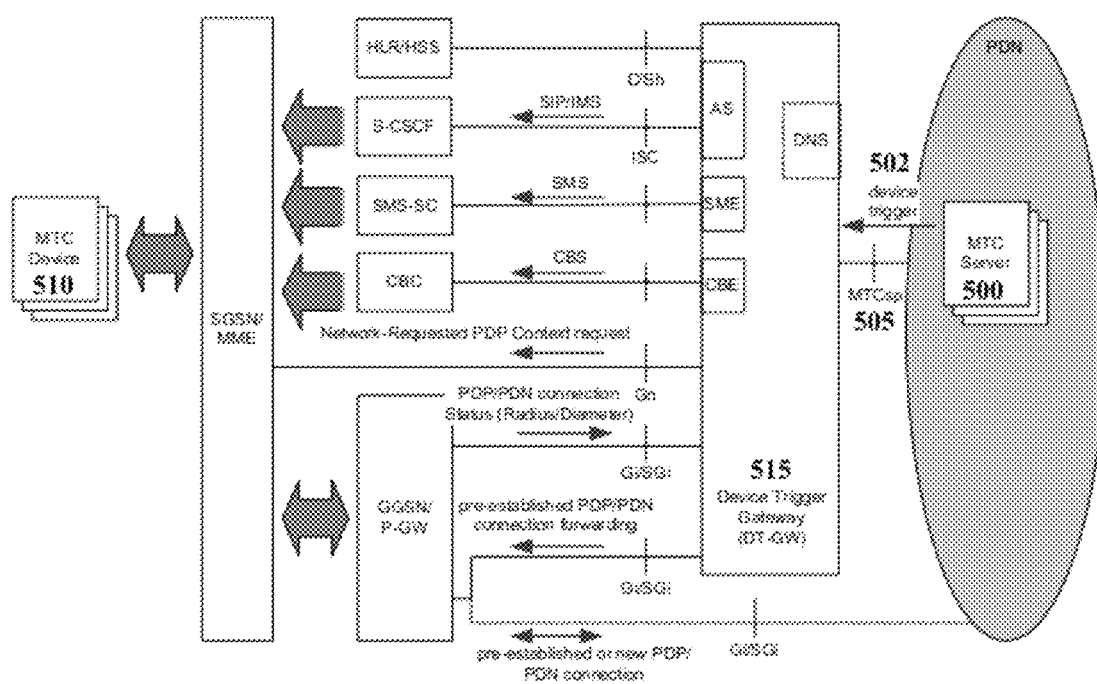
FIG. 5 illustrates how a device trigger sent from an MTC Server over the MTCsp reference point, can trigger a device to establish a connection for IP communication.

FIG. 5 illustrates how a device trigger 502 sent from a MTC Server 500 over the MTCsp reference point 505, can trigger a device 510 to establish the connection for IP communication. The device trigger 502 may be received and acted upon by a Device Trigger Gateway (DT-GW) 515. The DT-GW may communicate with the device 510 for triggering purposes via one or more of a variety of channels, as illustrated in FIG. 5.

To provide for efficient pinholes, the device trigger indication from a MTC Server could be extended to include an additional field to indicate one or more "lease times" that indicate the amount of time for which the triggering MTC Server/app wishes to be able to communicate with the device over one or more address+port combinations. This lease time then could be provided to the device by the HPLMN network along with the rest of the device trigger indication.

With this lease time value, the device now knows for how long it is to maintain the pinhole(s)/bindings in the boundary devices in the interface in the direction of the MTC Server/app. The device can therefore, send outbound keep-alive messages to create and maintain the port forwarding rules in the boundary device for just the time for which the MTC Server/app requires the ability to initiate inbound communication. After the lease time expires, the device can stop sending keep-alive messages, allowing the IP connection to go idle or disconnected, thus saving network resources and allowing the device to save power.

If the MTC Server/app determines it no longer needs to communicate with the device, the MTC Server/app can request the device to stop sending the keep-alive messages over MTCsp or through direct app level communications over the IP connection. Likewise, if the MTC Server/app needs more time to communicate with the device beyond the originally requested lease time, the MTC Server/app can request the device to extend the keep-alive period.

If the MTC Server does not specify a lease time in the device trigger indication, a PLMN network specified or device default value (either per device or per app) could be used as the lease time.

If the PLMN network wants to limit the lease time specified by the MTC Server, the network could specify the max lease time through signalling to the device or it could be configured in the device at manufacturing time or as part of device management procedures. The PLMN network may also NACK (Not ACKnowledge) the device trigger request from the MTC Server if the lease time exceeds the network's maximum allowed value.

If the connection between device and server is lost for any reason and the device is able to reconnect at some time before the current lease time expires, the device can re-establish the connection and continue with the keep-alive messaging (which will notify the MTC Server/app that the IP communications with the device is available again along with the new bindings/pinhole(s) that are created). This will allow the MTC Server or network application to resume communications with the device without having to trigger the device to reconnect or interrogate the PLMN or device for the current bindings. This could add additional efficiency for mobile networks as the MTC Server will no longer need to continuously send a trigger request over MTCsp to get the device to reconnect. The device will automatically do so once permitted by the PLMN network.

The MTC server or another, separate device and/or software application could manage and monitor the communication keep-alive timing by defining the time and changing it. This could be done for the communications between one of more devices and one or more servers and/or applications. The communication of an initial requirement to connect could be made using a variety of methods; including Short Messaging Services (SMS), Cell Broadcast Services (CBS), among other techniques.

Similarly, when a device other than the UE is configured for sending KA's, for example a KA server or KA proxy server, a trigger provided to the other device may include an additional field to indicate one or more "lease times" that indicate the amount of time for which the KA's are to be transmitted. Lease times may be released, renewed, adjusted, or the like, upon further messaging.

Apparatus

Embodiments of the present technology comprise an apparatus or system of apparatuses configured to perform the operations as described above. Such apparatuses are generally provided as computing devices having a communication module configured for network communication. The computing device may comprise one or more processors operatively coupled to memory, along with associated data interconnection hardware, power supplies, and the like, as would be readily understood by a worker skilled in the art. The computing device may be a server, virtual server, personal computer, network node, or the like. In some embodiments, the computing device may be a functional aspect of an existing computing device, for example an aspect of a boundary device, server, MNO infrastructure device, router, or the like. In some embodiments, the communication module may be configured to at least create and transmit KA messages using a predetermined set of network protocols. In some embodiments, the communication module may be configured to receive messages, such as KA messages, using a predetermined set of network protocols. For example, the communication module may be configured to transmit KA messages as TCP/IP packets over Ethernet or another suitable set of protocols.

The computing device may be configured to receive responses to KA messages, such as ICMP messages triggered upon discarding a KA message. The computing device may be configured to receive and process information indicative of how to configure the KA messages so that they are discarded as desired. This may include configuration information to facilitate filtering and information regarding appropriate TTL settings. Such information may be received in the form of explicit messages, network administrator configuration messages, or feedback to discovery attempts initiated by the computing device.

In some embodiments, a system of apparatuses may comprise a first apparatus configured to transmit KA messages, and a second apparatus configured to operate as a filtering network device. The filtering network device apparatus may be configured to receive messages, scan characteristics of each message to determine whether they correspond to a KA message to be discarded, and discard or forward the message as appropriate. As a filtering network device may potentially be required to filter a large amount of traffic, it may be required to process information quickly, queue incoming messages as required, and the like. In some embodiments, the filtering network device may be similar in functionality to an appropriately scaled router or server. A system of apparatuses may further comprise at least one apparatus configured to monitor network conditions, for example to actively discover the appropriate TTL settings to apply to KA packets using the TTL method of discard as described herein.

Figure 6:
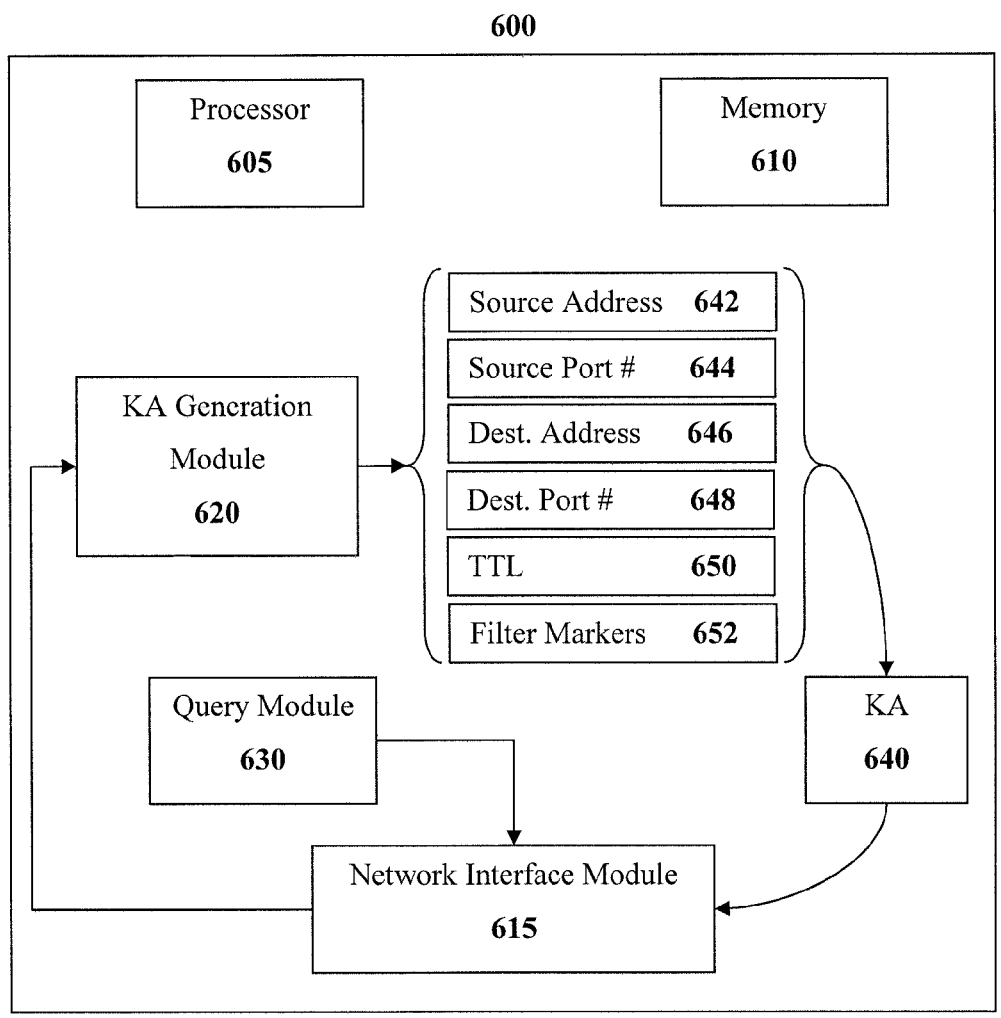
FIG. 6 illustrates an apparatus provided in accordance with embodiments of the present technology.

FIG. 6 illustrates an apparatus 600 provided in accordance with embodiments of the present technology. From a hardware perspective, the apparatus 600 comprises at least a processor 605, memory 610 and a network interface module 615 operatively coupled together. The apparatus hardware is configured, through software, firmware, or the like, to provide for a KA generation module 620 and, in some embodiments, a query module 630. The KA generation module 620 is configured to generate KA's 640 at specified time intervals, during specified time periods, in order to maintain a specified "pinhole" at the boundary device. The KA generation module configures the KA's 640 by adding address information and, in some embodiments, discard information, into fields of the KA messages 640, such as address fields, header fields, and payload fields. The address information includes a source address 642, a source port number 644, a destination address 646 and a destination port number 648. For some protocols, port numbers may not be required. The address information is configured to be indicative that the first communication device is the KA's source or destination. The KA generation module may, in some embodiments, further configure the KA so as to inhibit it from traversing a predetermined portion of the communication link. This may comprise one or both of: configuring a TTL 650 of the KA, and/or adding filtering markers 652 to the KA, the filtering markers for subsequent recognition by a filtering network device which discards packets having the filtering markers. After configuration, the apparatus 600 is configured to transmit the KA 640 via the network interface module 615.

The KA generation module 620 receives parameters for KA generation and configuration from the network interface module 615. Such parameters include address information and discard information, as well as time intervals and time periods for generating a sequence of KA's with similar address and discard information. The KA generation module 620 is typically capable of generating KA's for maintaining multiple pinholes at a time. Parameters for KA generation may be at least in part obtained via explicit instruction messages received by the network interface module 615. Parameters for KA generation may be at least in part obtained via messages received by the network interface module 615 in association with network monitoring operations performed by the apparatus 600.

The apparatus 600 may comprise a query module 630 which is configured to generate query messages for transmission by the network interface module 615. The query messages may comprise explicit queries for servers, network infrastructure devices, boundary devices, and the like. The queries may be configured to elicit responses which are indicative of the parameters for KA generation as described above. The queries may be configured for discovery of network conditions. For example, the query module 630 may be configured to perform traceroute operations, ping queries, or similar queries, for determining network path lengths to at least the boundary device and possibly network path lengths to the first and/or second communication devices. As such, the query module 630 may be configured to facilitate discovery of appropriate ranges of TTL values for KA 640 configuration.

It will be appreciated that, although specific embodiments have been described herein for purposes of illustration, various modifications may be made without departing from the spirit and scope of the invention. In particular, it is within the scope of the invention to provide a computer program product or program element, or a program storage or memory device such as a transmission medium, magnetic or optical wire, tape or disc, or the like, for storing signals readable by a machine, for controlling the operation of a computer according to the method of the invention and/or to structure its components in accordance with the system of the invention.

Further, each step of the methods may be executed on a general computer, such as a personal computer, server or the like and pursuant to one or more, or a part of one or more, program elements, modules or objects generated from any programming language, such as C, C++, Java, Perl, PL/1, or the like. In addition, each step, or a file or object or the like implementing each said step, may be executed by special purpose hardware or a circuit module designed for that purpose.

It is obvious that the foregoing embodiments of the technology are examples and can be varied in many ways. Such present or future variations are not to be regarded as a departure from the spirit and scope of the technology, and all such modifications as would be obvious to one skilled in the art are intended to be included within the scope of the following claims.

We claim:

1. A method of maintaining a first communication link between a first communication device and a second communication device, the first communication link established through a boundary device, the method comprising:

a. generating a keep-alive message at a keep-alive server operatively coupled to the boundary device via an auxiliary communication link, the keep-alive server having an IP address which differs from an IP address of the first communication device and an IP address of the second communication device, the keep-alive message being generated having address information indicative that either its origin is the first communication device and its destination is the second communication device or its origin is the second communication device and its destination is the first communication device, wherein said origin is spoofed as originating from either the IP address of the first communication device or the IP address of the second communication device, the address information being further indicative that the second communication device is its source or destination, the address information thereby purporting that the keep-alive message has traversed or is to traverse at least a second predetermined portion of the first communication link coupled to the second communication device and excluding the boundary device;

b. maintaining the first communication link through the boundary device by transmitting the keep-alive message toward the boundary device, wherein the keep-alive message is received by the boundary device, the address information purporting that the keep-alive message has traversed or is to traverse at least a first predetermined portion of the first communication link coupled to the first communication device and excluding the boundary device, the predetermined portion being separate from the auxiliary communication link; and c. inhibiting the keep-alive message from traversing the first predetermined portion and the second predetermined portion.

2. The method according to claim 1, wherein inhibiting the keep-alive message from traversing the predetermined portion comprises causing the keep-alive message to be discarded before it traverses the predetermined portion.

3. The method according to claim 2, wherein causing the keep-alive message to be discarded before it traverses the predetermined portion comprises configuring a time to live of the keep-alive message, such that the time to live expires after the keep-alive message traverses the boundary device and before the keep-alive message traverses the predetermined portion.

4. The method according to claim 3, wherein the keep-alive packet has as its destination the first communication device, and wherein configuring the time to live (TTL) of the keep-alive message comprises: notifying the keep-alive server, by the first device, that a prior keep-alive packet was received by the first device; and shortening the TTL relative to a TTL of the prior keep-alive packet.

5. The method according to claim 2, wherein causing the keep-alive message to be discarded before it traverses the predetermined portion comprises: marking the keep-alive message with an identifiable characteristic which is unchanged during packet traversal; and providing a filtering network device along the first communication link excluding the predetermined portion, the filtering network device configured to discard messages marked with the identifiable characteristic and forward messages unmarked by the identifiable characteristic.

6. The method according to claim 1, wherein the keep-alive server and the first communication device are located on a common side of the boundary device, and wherein the keep-alive message is generated so as to have its origin spoofed as originating from the first communication device, thereby achieving said inhibiting of the keep-alive message from traversing the predetermined portion.

7. The method according to claim 1, wherein the keep-alive server and the first device are located on opposite sides of the boundary device.

8. The method according to claim 7, further comprising spoofing the keep-alive message as originating from the second communication device.

9. The method according to claim 7, wherein the keep-alive server is a keep-alive proxy server operatively coupled to the boundary device via the auxiliary communication link, the keep-alive proxy server configured as a proxy server for communication with the second communication device.

10. The method according to claim 1, wherein the predetermined portion of the first communication link is an over-the-air link of a wireless network operated by a mobile network operator.

11. The method according to claim 1, further comprising discovering a length of time for which the boundary device is configured to maintain a pinhole supporting the first communication link, and transmitting successive keep-alive messages at a period less than but proportional to the length of time, and wherein discovering the length of time comprises progressively increasing the period until a pinhole timeout event is encountered due to transmission of a pair of successive keep-alive messages separated by a critical time interval, re-initiating the pinhole, and setting the period as a predetermined portion of the critical time interval.

12. An apparatus for maintaining a first communication link between a first communication device and a second communication device, the first communication link established through a boundary device, the apparatus comprising one or more computing devices and a network interface module and configured to generate and transmit a keep-alive message toward the boundary device via an auxiliary communication link, the apparatus having an IP address which differs from an IP address of the first communication device and an IP address of the second communication device, the keep-alive message comprising address information indicative that either its origin is the first communication device and its destination is the second communication device or its origin is the second communication device and its destination is the first communication device, wherein said origin is spoofed as originating from either the IP address of the first communication device or the IP address of the second communication device, the address information thereby purporting that the keep-alive message has traversed or is to traverse at least a first predetermined portion of the first communication link coupled to the first communication device and excluding the boundary device, the predetermined portion being separate from the auxiliary communication link; the keep-alive message thereby maintaining the first communication link through the boundary device upon reception by the boundary device, the keep-alive message further configured and transmitted so as to be inhibited from traversing the predetermined portion, the address information being further indicative that the second communication device is its source or destination, the address information thereby purporting that the keep-alive message has traversed or is to traverse at least a second predetermined portion of the first communication link coupled to the second communication device and excluding the boundary device, the apparatus being further configured to inhibit the keep-alive message from traversing the second predetermined portion.

13. The apparatus according to claim 12, wherein inhibiting the keep-alive message from traversing the predetermined portion comprises causing the keep-alive message to be discarded before it traverses the predetermined portion.

14. The apparatus according to claim 13, wherein causing the keep-alive message to be discarded before it traverses the predetermined portion comprises: marking the keep-alive message with an identifiable characteristic which is unchanged during packet traversal; and providing a filtering network device along the first communication link excluding the predetermined portion, the filtering network device configured to discard messages marked with the identifiable characteristic and forward messages unmarked by the identifiable characteristic.

15. The apparatus according to claim 12, wherein the apparatus is a keep-alive server configured to spoof the keep-alive message as originating from the first communication device, thereby achieving said inhibiting the keep-alive message from traversing the predetermined portion.

16. The apparatus according to claim 12, wherein the apparatus is a server operatively coupled to the boundary device, the server and the first device located on opposite sides of the boundary device.

17. The apparatus according to claim 16, wherein the server is a keep-alive server configured to spoof the keep-alive message as originating from the second communication device.

18. The apparatus according to claim 16, wherein the server is a keep-alive proxy server operatively coupled to the boundary device via an auxiliary communication link, the keep-alive proxy server configured as a proxy server for communication with the second communication device.

19. The apparatus according to claim 13, wherein causing the keep-alive message to be discarded before it traverses the predetermined portion comprises configuring a time to live of the keep-alive message, such that the time to live expires after the keep-alive message traverses the boundary device and before the keep-alive message traverses the predetermined portion.

20. The apparatus according to claim 12, wherein the predetermined portion of the first communication link is an over-the-air link of a wireless network operated by a mobile network operator.

21. A computer program product comprising a memory having computer readable code embodied therein, for execution by a CPU, for performing a method of maintaining a first communication link between a first communication device and a second communication device, the first communication link established through a boundary device, the method comprising:

a. generating a keep-alive message at a keep-alive server operatively coupled to the boundary device via an auxiliary communication link, the keep-alive server having an IP address which differs from an IP address of the first communication device and an IP address of the second communication device, the keep-alive message being generated having address information indicative that either its origin is the first communication device and its destination is the second communication device or its origin is the second communication device and its destination is the first communication device, wherein said origin is spoofed as originating from either the IP address of the first communication device or the IP address of the second communication device, the address information being further indicative that the second communication device is its source or destination, the address information thereby purporting that the keep-alive message has traversed or is to travetse at least a second predetermined portion of the first communication link coupled to the second communication device and excluding the boundary device, b. maintaining the first communication link through the boundary device by transmitting a keep-alive message toward the boundary device, wherein the keep-alive message is received by the boundary device, the address information thereby purporting that the keep-alive message has traversed or is to traverse at least a first predetermined portion of the first communication link coupled to the first communication device and excluding the boundary device, the predetermined portion being separate from the auxiliary communication link; and c. inhibiting the keep-alive message from traversing the first predetermined portion and the second predetermined portion.

\* \* \* \* \*